United States Patent
Dearing, Jr.

(10) Patent No.: US 7,441,609 B2
(45) Date of Patent: Oct. 28, 2008

(54) METHOD OF DECREASING THE DISINTEGRATION OF SHALE-CONTAINING CUTTINGS AND DRILLING FLUID THEREFOR

(75) Inventor: Harry L. Dearing, Jr., The Woodlands, TX (US)

(73) Assignee: Newpark Drilling Fluids, LLC, Houston, TX (US)

(*) Notice: Subject to any disclaimer, the term of this patent is extended or adjusted under 35 U.S.C. 154(b) by 78 days.

(21) Appl. No.: 11/263,639

(22) Filed: Oct. 31, 2005

(65) Prior Publication Data

US 2006/0054359 A1   Mar. 16, 2006

Related U.S. Application Data

(63) Continuation-in-part of application No. 10/819,844, filed on Apr. 7, 2004, now Pat. No. 7,137,459.

(60) Provisional application No. 60/461,993, filed on Apr. 11, 2003.

(51) Int. Cl.
*E21B 21/00* (2006.01)
*E21B 47/00* (2006.01)

(52) U.S. Cl. .................. 175/40; 73/152.19; 73/152.43; 175/65; 175/72; 507/140; 507/141

(58) Field of Classification Search .................. 175/40, 175/65, 72; 73/152.19, 152.23, 152.43; 507/140, 507/141, 145
See application file for complete search history.

(56) References Cited

U.S. PATENT DOCUMENTS

| | | | | | |
|---|---|---|---|---|---|
| 2,133,759 | A | * | 10/1938 | Vail et al. | 507/145 |
| 2,146,693 | A | * | 2/1939 | Vietti et al. | 507/145 |
| 2,353,230 | A | * | 7/1944 | Garrison et al. | 175/66 |
| 2,729,426 | A | * | 1/1956 | Smith | 175/68 |
| 3,259,189 | A | * | 7/1966 | Darley | 166/292 |
| 3,499,491 | A | * | 3/1970 | Wyant et al. | 166/292 |
| 3,640,343 | A | * | 2/1972 | Darley | 166/292 |
| 3,679,001 | A | * | 7/1972 | Hill | 166/292 |
| 3,746,109 | A | * | 7/1973 | Darley | 175/66 |
| 4,988,450 | A | * | 1/1991 | Wingrave et al. | 507/118 |
| 5,211,250 | A | * | 5/1993 | Kubena et al. | 175/72 |
| 7,226,895 | B2 | * | 6/2007 | Xiang | 507/140 |

* cited by examiner

*Primary Examiner*—George Suchfield
(74) *Attorney, Agent, or Firm*—Jones & Smith, LLP; John Wilson Jones

(57) ABSTRACT

The invention provides a method of enhancing the recovery of shale-containing cuttings during the drilling of a borehole in a shale-containing subterranean formation which comprises adding to the drilling fluid circulating in the borehole a finely ground, very sparingly soluble, anhydrous, alkali metal silicate glassy material to provide the drilling fluid with a concentration of soluble silica in the range from about 0.1% to about 1.0% by weight of the aqueous phase of the drilling fluid. Preferably the drilling fluid has a pH in the range from about 8.0 to about 11.0, most preferably about 8.5 to less than 11.0. The preferred alkali metal is potassium.

18 Claims, No Drawings

METHOD OF DECREASING THE DISINTEGRATION OF SHALE-CONTAINING CUTTINGS AND DRILLING FLUID THEREFOR

RELATED APPLICATION

This application is a continuation-in-part application of U.S. application Ser. No. 10/819,844 filed Apr. 7, 2004 now U.S. Pat. No. 7,137,459, which claims the benefit of Provisional Application Ser. No. 60/461,993 filed Apr. 11, 2003.

FIELD OF THE INVENTION

The invention relates to aqueous oil and gas well drilling and servicing fluids containing an additive to enhance the recovery of shale-containing drill cuttings.

BACKGROUND OF THE INVENTION

During well-drilling operations, formations are often encountered which lose physical and dimensional integrity when exposed to aqueous drilling fluids (muds). In most cases, such formations comprise reactive shales. Prior to the advent of oil-based, emulsion and invert emulsion muds, great difficulty was encountered in drilling these types of shales. On the other hand, while hydrocarbon-containing muds make drilling through reactive shales possible, they pose safety and environmental hazards and can interfere with well-logging operations.

A variety of water-based drilling additives has been developed over the years in an attempt to deal with shale drilling problems effectively while avoiding the problems encountered when oil-based muds were used.

Sawdon, in U.K. Patent Application 2,089,397A, disclosed an aqueous wellbore fluid for use in drilling, well completion, packing, perforating or workover fluid containing at least 20% by weight of potassium carbonate; optionally a water-soluble polymeric viscosifier, such as carboxymethylcellulose, was added to the wellbore fluid. Gray et al., in "Composition and Properties of Oil Well Drilling Fluid", 4th Edition (Gulf Publishing Company 1980), reported the use of potassium salts in drilling fluids to suppress the swelling of bentonite, potassium chloride being preferred. Another standard industry reference that describes the shale stabilizing effect of the potassium ion in polymer muds may be found in SPE 10100 "Fundamentals and Use of Potassium/Polymer Drilling Fluids to Minimize Drilling and Completion Problems Associated with Hydratable Clays," by R. P. Steiger, presented at the 56th Annual Fall Technical Conference, Dallas, Tex., Oct. 5-7, 1981. U.S. Pat. No. 4,447,341, to Block relates to a drilling fluid containing an aluminum hydroxide of the formula AlO(OH) and a crosslinked polyvinyl alcohol together with a potassium salt, such as potassium chloride, as a clay-stabilizing composition. Coffey et al., in the Oil & Gas Journal, Jan. 27, 1987, described shale inhibition using an aqueous system, maintained at a pH of 9.0 or less, which contains an unidentified nonionic polymer combined with potassium phosphate complex of undefined composition. Peterson in U.S. Pat. No. 4,780,220 discloses the use of glycerin, polyglycerin, and mixtures thereof in a drilling mud to inhibit the swelling of clays.

The technology of choice for aqueous-based shale-stabilizing muds involves the use of partially hydrolyzed polyacrylamide (PHPA) combined with potassium chloride. Scheuerman disclosed such a combination in U.S. Pat. No. 3,738,437 as part of a regimen for dealing with shale-drilling problems. Systems involving PHPA in combination with various electrolytes, including potassium chloride, at pH of 8.5 to 10.0, were also reviewed by Clark et al. in SPE/IADC 10681, presented at the Mar. 15-18, 1987 SPE/IADC Drilling Conference in New Orleans, La.

Cannon U.S. Pat. Nos. 2,109,858 and 2,191,312 generally disclose the addition of various polyhydroxy compounds, which includes certain carbohydrates such as sucrose, and an alkaline material, such as caustic soda, in aqueous drilling fluids for purposes of inhibiting shale swelling.

Salathiel U.S. Pat. No. 2,785,125 discloses a water base drilling fluid containing 1-15 ppb starch and 0.5-10 ppb of a water soluble heat degradation product of a saccharide containing 1 to 4 sugar units. The starch and degradation product combine to reduce the fluid loss of the drilling fluid. Salathiel U.S. Pat. No. 2,786,027 discloses a water base drilling fluid containing 1-15 ppb starch and 0.5-5 ppb of an additive having an average molecular weight of about 90 to 3000 and a ratio of carbon to oxygen of 1.5 to 2.7. The starch and additive combine to reduce the fluid loss of the drilling fluid. Walker U.S. Pat. No. 3,849,317 discloses a water base drilling fluid having a liquid phase saturated with calcium hydroxide containing as an additive for reducing gel strength and yield point, from ⅛ to 8 ppb of hydrolyzed cereal solids which is comprised of from about 15% to about 25% di-saccharides, tri-saccharides, tetrasaccharides, and penta-saccharides, and from 75% to 85% hexa-saccharides and above. Perricone et al. U.S. Pat. No. 4,941,981 discloses a drilling fluid for shale inhibition comprising a liquid phase containing: (a) a water phase comprising fresh water, sea water, brine, simulated brine, or mixtures thereof; and (b) a water-soluble component selected from the class consisting of polyhydric alcohols, glycol, glycol ethers, polypropylene glycols, polyethylene glycols, ethylene oxide-propylene oxide copolymers ("EO-PO"), alcohol-initiated EO-PO copolymers and/or mixtures thereof, the concentration of said water-soluble component in the total liquid phase being from about 5% to about 50% by volume.

Sheu et al. U.S. Pat. No. 5,110,484 discloses aqueous drilling fluids containing the browning reaction product of a carbohydrate, such as pentose, hexose such as fructose and glucose, as well as di- and poly saccharides, such as sucrose, lactose, mannose, cellulose, starch, dextrin, dextran, carboxymethylcellulose, rice and derivatives of such carbohydrates.

Drilling fluids containing alkali metal silicates have also been proposed for drilling shale-containing formations. Thus Vail et al., in U.S. Pat. No. 2,133,759, disclose muds containing alkali metal silicates. In U.S. Pat. No. 2,146,693, Vietti et al. disclosed a drilling fluid containing one of several sodium salts, including sodium silicate, the sodium salt content of the mud being in excess of 20% by weight. The following U.S. patents also disclose sodium silicate-containing drilling fluids: Vietti et al. U.S. Pat. No. 2,165,824; Garrison U.S. Pat. No. 2,239,647; and Garrison et al. U.S. Pat. No. 2,353,230.

Wingrave et al. U.S. Pat. No. 4,988,450 discloses drilling fluids containing a shale stabilizing additive comprising one or more water-soluble polymers which are capable of forming nucleophilic sites when treated with a base, such as partially hydrolyzed polyvinyl acetate, and one or more alkaline potassium salts in a weight ratio generally in the range between 1:20 to about 3:1, preferably from about 1:2 to about 1.5:1. Usually the additive is added to the drilling fluid at a level between 0.01 weight percent and 10.0 weight percent of the aqueous phase, typically between about 0.1 and about 4.0 weight percent, and preferably between about 0.3 and about 2.0 weight percent. The potassium salts are relatively strong Bronated-Lowry bases, such as potassium silicate, potassium carbonate, and tribasic potassium phosphate.

Mullen et al. U.S. Pat. No. 6,248,698 discloses silicate drilling fluids containing hematite weighting agents and manganese oxide bridging agents.

Daley U.S. Pat. No. 3,640,343 discusses the stabilization of hard shaly formations with an aqueous solution containing from about 1% to about 20% by weight of dissolved alkali metal silicate (preferably containing from about 2% to about 6% by wt. of dissolved silica), and a pH from 11-12, preferably 11.1-11.4

Wyant et al. U.S. Pat. No. 3,499,491 discloses the treatment of an aqueous drilling fluid with a cementitious mixture comprising hydraulic cement and powdered sodium silicate glass to form a mud concrete for cementing oil well casing.

The following articles discuss the use of soluble silicates in drilling fluids: (1) John C. Urquhart "Back to the Future in Silicate Drilling Fluids, WORLD OIL, October 1998; (2) Michael R. Stewart et al., "Use of Silicate Mud to Control Borehole Stability and Overpressured Gas Formations in Northeastern British Columbia" SPE 59751, 2000; (3) Tare et al., "Stabilizing Boreholes While Drilling Reactive Shale Formations with Silicate-Base Drilling Fluids", DRILLING CONTRACTOR, May/June 2000, pp. 42-44; (4) Dave Rawlyk et al., "Potassium Silicate Based Drilling Fluids: An Environmentally Friendly Drilling Fluid Providing Higher Rates of Penetration," CADE/CAODC Drilling Conference, Paper No. 2001-016, Oct. 23 & 24, 2001; and Walton et al., "Drilling Fluid and Cementing Improvements Reduced Per-ft Drilling Costs by 10%, World Oil, April 2003, 39-43, 47.

Although drilling fluids containing sodium and potassium silicates have been used for decades to combat shale problems, these fluids have had limited success for the following reasons: free soluble silicate in the drilling fluid reacts with accumulated drilled solids to create problems in control of the drilling fluid properties; free soluble silicate in the drilling fluid filtrate polymerizes or precipitates after invading a potentially productive formation to cause severe reduction in permeability; free soluble silicate in the drilling fluid precludes the use of lubricants commonly used for torque reduction, and the high pH of such fluids make them hazardous to handle.

SUMMARY OF THE INVENTION

The invention provides well drilling and servicing fluids which utilize a finely ground, very sparingly soluble, anhydrous alkali metal silicate glassy material to decrease the swelling and water sorption of shale-containing cuttings contacted by the well drilling and servicing fluid, and hence the disintegration, wherein the concentration of the finely ground, very sparingly soluble anhydrous alkali metal silicate glassy material is such as to provide the fluids with a concentration of soluble silica in the range from about 0.1% to about 1.0% by weight of the aqueous phase of the fluid, and wherein the fluids have a pH in the range from about 8.0 to about 11.0, preferably from about 8.5 to about 10.5.

The invention further provides a method of increasing the recovery of shale-containing cuttings during the drilling of a borehole in a shale-containing subterranean formation in which a drilling fluid is circulated in the borehole during drilling, which comprises adding to the circulating drilling fluid a finely ground, very sparingly soluble, anhydrous alkali metal silicate glassy material at a rate to provide the drilling fluid with a concentration of soluble silica measured at the flowline in the range from about 0.1% to about 1.0% by weight of the aqueous phase of the drilling fluid.

The finely ground, very sparingly soluble, anhydrous alkali metal silicate glassy material (hereinafter sometimes referred to as "FGVSSAAMSGM") is obtained from the fusion or melt of an alkali metal oxide or precursor thereof (i.e., hydroxide or carbonate) and silica which is then super-cooled and finely ground.

The main technical benefit of incorporating the FGVSSAAMSGM instead of liquid silicate solutions and hydrous powder forms of alkali metal silicates into the fluids is that the slower rate of dissolution of the FGVSSAAMSGM will reduce the undesirable reactions of the silicate with components in the fluids and will expose the cuttings and wellbore contacted by the fluids to the reactive silicate solids.

Other purposes, distinction over the art, advantages and features of this invention will be apparent to one skilled in the art upon reading this specification and the appended claims.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DESCRIPTION OF THE PREFERRED EMBODIMENTS

The FGVSSAAMSGM is preferably formed by finely grinding an anhydrous sodium silicate glass or an anhydrous potassium silicate glass.

The silicon dioxide to sodium oxide weight ratio in the sodium silicate glass is in the range from about 1.5:1 to about 3.3:1, preferably from about 1.75:1 to about 2.7:1, most preferably in the range from about 2.0:1 to about 2.5:1.

The silicon dioxide to potassium oxide weight ratio in the potassium silicate glass is in the range from about 2:1 to about 3.5:1, preferably from about 2.25:1 to about 3.25:1, most preferably from about 2.5:1 to about 3.0:1.

Silicate glasses of such ratios are very sparingly soluble thus having high dissolution times. As used herein, the phrase "very sparingly soluble" is intended to mean that the solubility of the anhydrous alkali metal silicate after one hour at 40° C. (104° F.) at a concentration of one lb/bbl (0.2857 w/v %) in deionized water is such that greater than about 20% of the anhydrous sodium silicate and greater than about 45% of the anhydrous potassium silicate remain undissolved.

The particle size of the FGVSSAAMSGM should be smaller than the openings of any screens which are utilized during circulation of the well drilling and servicing fluids to remove the drill cuttings from the fluids. Thus the FGVSSAAMSGM will remain in the well drilling and servicing fluids while continuing the well drilling and servicing operations.

Preferably 90% by weight of the particles of the FGVSSAAMSGM will pass through a 200 mesh screen, U.S. Sieve Series (i.e., 74 microns).

The fluids of this invention will contain a continuous aqueous phase with additives added thereto to provide the fluids with the desired properties and characteristics. These additives may be viscosifiers, suspending agents, fluid loss control agents, weighting materials, lubricity agents, other shale inhibitors, soluble salts, an emulsified oleaginous phase, and other additives all as is known in the well drilling and servicing fluid art.

The well drilling and servicing fluids of this invention containing the FGVSSAAMSGM have a pH in the range from about 8.0 less than 11.0, preferably from about 8.5 to about 10.5.

The well drilling and servicing fluids of this invention containing the FGVSSAAMSGM may have incorporated therein one or more water soluble salts to further decrease the swelling and water sorption of shales and shale-containing cuttings contacted by the well drilling and servicing fluids. The water soluble salts should have a monovalent cation to prevent the precipitation of the soublized silicate anion and reaction with the solid FGVSSAAMSGM. Preferred are potassium salts such as potassium carbonate, potassium chloride, potassium formate; potassium acetate and other water soluble potassium salts.

In order to more completely describe the invention, the following non-limiting examples are given. In these examples and the specification, the following abbreviations may be used, all as are well known in the art: lb=pound; API=American Petroleum Institute; gal=gallon; l=liter; hr=hour; HR=hot roll; AM=alkali metal; °F.=degrees Fahrenheit; g=grams; mg=milligrams; ml=milliliters; min=minutes; cP=centipoises; rpm=revolutions per minute; in=inches; ft=foot.

In the examples, New Gel NT™, New Edge™, and NEW PAC LV™, products of Newpark Drilling Fluids, Inc., Houston, Tex. are respectively: an untreated bentonite clay; an oxidized sub-bituminous coal; and a low viscosity polyanionic cellulose.

Examples of the fluids of this invention and the effect of either a finely ground (−200 mesh (U.S. Standard Sieve Series) or −74 microns) anhydrous sodium silicate glass having a $SiO_2/Na_2O$ wt. ratio of 2.0 or a finely ground anhydrous potassium silicate glass having a $SiO_2/K_2O$ wt. ratio of 2.5 on the properties of the fluids is set forth hereinafter. The properties were measured by the procedure set forth in API Recommended Practice RP13B. The SHALE RECOVERY testing procedure is as follows:

After mixing, the mud properties for each sample are tested. Wedges cut from a preserved downhole shale core were placed in each of the muds, which had been hot rolled, and the muds were rolled an additional 16 hr at 150° F. The initial moisture of the shale was determined. Each shale wedge was tested as to initial weight (approximately 30 to 40 g) and both wet and dry weight after exposure to a mud. These tests permitted calculation of the percent by weight recovery of the simulated shale cuttings and the moisture content of the shale exposed to each of the muds. The shale used for this testing was a preserved downhole shale cored at a depth of about 12,900 ft in the Mississippi Canyon Block 751 area of the Gulf of Mexico.

TABLE 1

Effectiveness of FGVSSAAMSGM in Inhibiting the Hydration and Dispersion Of Simulated Shale Cuttings, AM = Sodium

| | Composition Number | | | | | | | |
|---|---|---|---|---|---|---|---|---|
| | 1-1 | | 1-2 | | 1-3 | | Base Mud | |
| Base Mud, ml | 350 | | 350 | | 350 | | 350 | |
| Freshwater, ml | 341 | | 341 | | 341 | | 341 | |
| NewGel NT, g | 22.5 | | 22.5 | | 22.5 | | 22.5 | |
| Caustic Soda, g | 1.25 | | 1.25 | | 1.25 | | 1.25 | |
| New Edge, g | 5.0 | | 5.0 | | 5.0 | | 5.0 | |
| NewPac LV, g | 0.5 | | 0.5 | | 0.5 | | 0.5 | |
| SS C200 (Na Silicate) g(*) | 0.25 (0.07) | | 0.50 (0.146) | | 1.0 (0.292) | | 0 | |
| API Rheology | 80° F. | 120° F. | 80° F. | 120° F. | 80° F. | 120° F. | 80° F. | 120° F. |
| 600 rpm | 27 | 18 | 27 | 18 | 28 | 22 | | |
| 300 rpm | 16 | 11 | 16 | 11 | 17 | 14 | | |
| 200 rpm | 13 | 8 | 12 | 9 | 13 | 11 | | |
| 100 rpm | 8 | 6 | 8 | 7 | 8 | 7 | | |
| 6 rpm | 3 | 3 | 3 | 3 | 3 | 3 | | |
| 3 rpm | 2 | 2 | 2 | 2 | 2 | 2 | | |
| Plastic Viscosity, cP | 11 | 7 | 11 | 7 | 11 | 7 | | |
| Yield Point, lb/100 ft² | 5 | 4 | 5 | 4 | 5 | 7 | | |
| Initial Gel, lb/100 ft² | 3 | 3 | 3 | 3 | 3 | 3 | | |
| 10 min Gel, lb/100 ft² | 7 | 6 | 6 | 7 | 7 | 8 | | |
| Measure Density, lb/gal | 8.60 | | 8.60 | | 8.60 | | 8.60 | |
| pH | 10.71 | | 10.77 | | 10.91 | | 10.68 | |
| After hot rolling 16 hr @ 150° F. | | | | | | | | |
| API Rheology | 80° F. | 120° F. | 80° F. | 120° F. | 80° F. | 120° F. | 80° F. | 120°F. |
| 600 rpm | 57 | 37 | 64 | 44 | 65 | 43 | 44 | 32 |
| 300 rpm | 34 | 22 | 38 | 27 | 37 | 25 | 26 | 20 |
| 200 rpm | 25 | 17 | 28 | 20 | 27 | 19 | 20 | 14 |
| 100 rpm | 16 | 11 | 18 | 1 | 17 | 12 | 12 | 10 |
| 6 rpm | 5 | 4 | 6 | 5 | 5 | 4 | 5 | 4 |
| 3 rpm | 4 | 3 | 4 | 3 | 3 | 3 | 4 | 3 |
| Plastic Viscosity, cP | 23 | 15 | 26 | 17 | 28 | 18 | 18 | 12 |
| Yield Point, lb/100 ft² | 11 | 7 | 12 | 10 | 9 | 7 | 8 | 8 |
| Initial Gel, lb/100 ft² | 5 | 4 | 6 | 5 | 5 | 4 | 4 | 4 |
| 10 min Gel, lb/100 ft² | 12 | 8 | 13 | 9 | 10 | 7 | 11 | 10 |
| pH | 9.54 | | 9.71 | | 9.96 | | 9.48 | |
| API Filtrate, ml/30 min | 8.9 | | 9.7 | | 12.0 | | 7.8 | |
| API Filter Cake, 1/32nd in | 2 | | 2 | | 3 | | 2 | |
| API Mud Alkalinity, ml | 1.6 | | 1.8 | | 2.0 | | 1.5 | |
| API Filtrate Alkalinites, Pf/Mf, ml | 0.90/1.90 | | 1.10/2.10 | | 1.40/2.30 | | 0.80/1.80 | |
| Calcium, mg/l | 40 | | 40 | | 40 | | 40 | |
| Chlorides, mg/l | 700 | | 700 | | 800 | | 800 | |

TABLE 1-continued

Effectiveness of FGVSSAAMSGM in Inhibiting the Hydration and Dispersion Of Simulated Shale Cuttings, AM = Sodium

| | Composition Number | | | |
|---|---|---|---|---|
| | 1-1 | 1-2 | 1-3 | Base Mud |
| Filtrate Sodium, mg/l | 4,230 | 3,246 | 3,365 | 3,545 |
| Filtrate Potassium, mg/l | 37 | 42 | 32 | 37 |
| Activity | 0.990 | 0.992 | 0.995 | 0.993 |
| SHALE RECOVERY | | | | |
| Initial shale weight, g | 31.66 | 34.04 | 38.43 | 29.50 |
| After HR exposure, weight, g | 4.14 | 6.84 | 21.02 | 3.02 |
| After HR exposure, dried weight, g | 2.44 | 4.18 | 14.97 | 1.72 |
| Cuttings recovery after hot rolling, wt % | 9 | 14 | 44 | 7 |
| Moisture content after hot rolling, wt % | 41 | 39 | 29 | 43 |
| Shale Activity | 0.957 | 0.955 | 0.949 | 0.977 |

(*)wt. % AM Silicate based on the aqueous phase

TABLE 2

Effectiveness of FGVSSAAMSGM in Inhibiting the Hydration and Dispersion Of Simulated Shale Cuttings, AM = Potassium

| | Composition Number | | | | | | | |
|---|---|---|---|---|---|---|---|---|
| | 2-1 | | 2-2 | | 2-3 | | Base Mud | |
| Base Mud, ml | 350 | | 350 | | 350 | | 350 | |
| Freshwater, ml | 341 | | 341 | | 341 | | 341 | |
| NewGel NT, g | 22.5 | | 22.5 | | 22.5 | | 22.5 | |
| Caustic Soda, g | 1.25 | | 1.25 | | 1.25 | | 1.25 | |
| New Edge, g | 5.0 | | 5.0 | | 5.0 | | 5.0 | |
| NewPac LV, g | 0.5 | | 0.5 | | 0.5 | | 0.5 | |
| Kasil SS (K Silicate) g(*) | 0.25(0.07) | | 0.50(0.146) | | 1.0(0.292) | | 0 | |
| API Rheology | 80° F. | 120° F. | 80° F. | 120° F. | 80° F. | 120° F. | 80° F. | 120° F. |
| 600 rpm | 30 | | 19 | 29 | 20 | 30 | 22 | |
| 300 rpm | 19 | | 13 | 17 | 14 | 18 | 15 | |
| 200 rpm | 13 | | 9 | 12 | 11 | 14 | 11 | |
| 100 rpm | 9 | | 7 | 8 | 7 | 9 | 7 | |
| 6 rpm | 3 | | 3 | 3 | 3 | 3 | 3 | |
| 3 rpm | 2 | | 2 | 2 | 2 | 2 | 2 | |
| Plastic Viscosity, cP | 11 | | 6 | 12 | 6 | 12 | 7 | |
| Yield Point, lb/100 ft² | 8 | | 7 | 5 | 8 | 6 | 8 | |
| Initial Gel, lb/100 ft² | 3 | | 3 | 3 | 3 | 3 | 3 | |
| 10 min Gel, lb/100 ft² | 7 | | 6 | 6 | 8 | 6 | 7 | |
| Measure Density, lb/gal | 8.60 | | 8.60 | | 8.60 | | 8.60 | |
| pH | 10.70 | | 10.75 | | 10.84 | | 10.68 | |
| After hot rolling 16 hr @ 150° F. | | | | | | | | |
| API Rheology | 80° F. | 120° F. | 80° F. | 120° F. | 80° F. | 120° F. | 80° F. | 120°F. |
| 600 rpm | 54 | 34 | 66 | 39 | 84 | 50 | 44 | 32 |
| 300 rpm | 32 | 20 | 40 | 24 | 51 | 30 | 26 | 20 |
| 200 rpm | 23 | 14 | 29 | 17 | 38 | 24 | 20 | 14 |
| 100 rpm | 14 | 10 | 18 | 11 | 24 | 15 | 12 | 10 |
| 6 rpm | 4 | 3 | 5 | 4 | 7 | 5 | 4 | 4 |
| 3 rpm | 3 | 3 | 4 | 3 | 5 | 4 | 4 | 3 |
| Plastic Viscosity, cP | 22 | 14 | 26 | 15 | 33 | 20 | 18 | 12 |
| Yield Point, lb/100 ft² | 10 | 6 | 14 | 9 | 18 | 10 | 8 | 8 |
| Initial Gel, lb/100 ft² | 4 | 3 | 5 | 4 | 7 | 5 | 4 | 4 |
| 10 min Gel, lb/100 ft² | 8 | 7 | 9 | 8 | 10 | 11 | 11 | 10 |
| pH | 10.52 | | 10.56 | | 10.72 | | 9.48 | |
| API Filtrate, ml/30 min | 8.8 | | 9.8 | | 11.0 | | 7.8 | |
| API Filter Cake, 1/32ⁿᵈ in | 2 | | 2 | | 3 | | 2 | |
| API Mud Alkalinity, ml | 1.1 | | 1.2 | | 1.4 | | 1.50 | |
| Filtrate Alkalinites, Pf/Mf, ml | 0.70/1.60 | | 0.80/1.70 | | 1.20/2.10 | | 0.80/1.80 | |
| Calcium, mg/l | 40 | | 40 | | 40 | | 40 | |
| Chlorides, mg/l | 700 | | 700 | | 800 | | 500 | |
| Filtrate Sodium, mg/l | 2,852 | | 2,598 | | 3,233 | | 3,545 | |
| Filtrate Potassium, mg/l | 95 | | 164 | | 245 | | 37 | |
| Activity | 0.997 | | 0.996 | | 0.995 | | 0.993 | |
| SHALE RECOVERY | | | | | | | | |
| Initial shale weight, g | 25.29 | | 32.05 | | 36.85 | | 29.50 | |
| After HR exposure weight, g | 2.91 | | 7.94 | | 16.04 | | 3.02 | |
| After HR exposure dried, weight, g | 1.63 | | 4.91 | | 12.48 | | 1.72 | |
| Cuttings recovery after hot rolling, wt % | 7 | | 17 | | 38 | | 7 | |

TABLE 2-continued

Effectiveness of FGVSSAAMSGM in Inhibiting the Hydration and Dispersion Of Simulated Shale Cuttings, AM = Potassium

| | Composition Number | | | |
| --- | --- | --- | --- | --- |
| | 2-1 | 2-2 | 2-3 | Base Mud |
| Moisture content after hot rolling, wt % | 44 | 38 | 22 | 43 |
| Shale Activity | 0.948 | 0.946 | 0.941 | 0.977 |

(*)wt. % AM Silicate based on the aqueous phase

The process of this invention of increasing the recovery of shale-containing cuttings while circulating a drilling fluid in a borehole while drilling is exemplified by utilizing the drilling fluids of examples 1-2, 1-3, 2-2 and 2-3 in which the concentration of the FGVSSAAMSGM is greater than about 0.1% by weight of the aqueous phase of the drilling fluid.

The concentration of soluble silica in the aqueous phase of the drilling fluid is determined by measuring the concentration of silica in the filtrate obtained from the drilling fluid at the flowline of the well. The filtrate can be obtained by any filtration procedure which separates the liquid and solid phases of the drilling fluid, such as the filtration procedures set forth in API Recommended Practice RP 13B.

A suitable titration method for measuring the concentration of silica in the filtrate is to determine the alkali concentration by titrating the filtrate with 0.2 normal HCl followed by titrating another sample of the filtrate with 2.0 normal HCl as follows:

Field Test Method for Alkali Content in an Alkali Metal Silicate Drilling Fluid

1. Principle:

A sample of potassium silicate drilling fluid filtrate is weighed into a flask and mixed with water and a small amount of indicator (methyl orange). The mixed solution is then titrated with 0.2 N HCl acid. All materials that react with acid are titrated and are calculated as a percent potassium oxide ($K_2O$).

2. Equipment and Chemicals:
    1. Hydrochloric Acid (HCl)—0.2 Normal
    2. Prepared Methyl Orange Indicator* (actually green in color)
    *Methyl orange xylene can be purchased at most major suppliers of laboratory chemicals (i.e., Fisher Scientific)
    3. Beaker—400 ml
    4. Calibrated Burette/Pipette—25 ml
    5. Graduated Cylinder—100 ml 3. Safety:

Follow safe laboratory procedures such as wearing eye protection and gloves while handling chemicals.

4. Procedure:

a. Measure 5 ml (to the nearest 0.1 ml) of an alkali metal silicate drilling fluid filtrate into a beaker.

b. Add 100 ml of distilled water and swirl beaker until completely mixed.

c. Add 4 drops of prepared methyl orange indicator and swirl beaker, solution will turn green.

d. Titrate sample with 0.2 Normal HCl acid till a grey/light purple color develops e. Record volume of HCl acid used.

5. Calculation:

| For Potassium Silicate | For Sodium Silicate |
| --- | --- |
| $\dfrac{V \times 0.94}{W} = \% K_2O$ | $\dfrac{V \times 0.62}{W} = \% Na_2O$ |

V=volume in ml of HCl used during titration
W=weight in grams of silicate drilling fluid sample 6. Precision and Accuracy:

Samples should be done in duplicate. Accuracy of this procedure can be effected by other mud ingredients (ex. caustic, sodium silicate, sodium carbonate etc.) acid/or possible contamination from the drill hole.

Field Test Method for Silica Content in an Alkali Metal Silicate Drilling Fluid

1. Principle:

A sample of silicate drilling fluid filtrate is weighed into a flask and mixed with water and a small amount of indicator (methyl red). The mixed solution is then titrated with 2.0N HCl acid until the solution turns and stays reddish-orange.

2. Equipment and Chemicals:
    1. Hydrochloric Acid (HCl)—2.0 Normal
    2. Sodium Fluoride
    3. Prepared Methyl Red* (actually orange in color)
    *1 gram methyl red indicator dissolved in 600 ml methanol. Add 400 ml distilled water to bring final volume to 1 liter.
    4. Beaker—400 ml
    5. Calibrated Burette/Pipette—25 ml
    6. Graduated Cylinder—100 ml 3. Safety:

Follow safe laboratory procedures such as wearing eye protection and gloves when handling chemicals. It is recommended that a dust mask be worn when handling NaF powder.

4. Procedure:

a. Measure 5 ml (to the nearest 0.1 ml) of an alkali metal silicate drilling fluid filtrate into a beaker.

b. Add 100 ml of distilled water and swirl beaker until completely mixed.

c. Add 4 drops of prepared methyl red indicator and swirl beaker, solution will turn yellow.

d. Titrate sample with 2.0 Normal HCl acid to a red color, while stirring constantly.

e. Add 4 g of previously weighed sodium fluoride and mix thoroughly. The color will turn back to yellow.

f. Continue titration after the addition of sodium fluoride. Titrate until the yellow color disappears and a reddish-orange color develops and stays.

5. Calculation:

| For Potassium Silicate | For Sodium Silicate |
|---|---|
| $\dfrac{\% \text{ K}_2\text{O} \times \text{W}}{9.42}$ = alkali correction (AC) | $\dfrac{\% \text{ Na}_2\text{O} \times \text{W}}{6.2}$ = alkali correction (AC) |
| $\dfrac{(\text{V} - \text{AC}) \times 3.0}{\text{W}}$ = % SiO$_2$ | $\dfrac{(\text{V} - \text{AC}) \times 3.0}{\text{W}}$ = % SiO$_2$ |

% K$_2$O, % Na$_2$O=previously calculated from alkali titration
V=volume in ml of HCl used during titration
W=weight in grams of silicate drilling fluid filtrate sample 6. Precision and Accuracy:

Samples should be done in duplicate. Accuracy of this procedure can be effected by other mud ingredients and/or possible contamination from the drill hole.

What is claimed is:

1. A method of increasing the recovery of shale-containing cuttings during the drilling of a borehole in a shale-containing subterranean formation which comprises circulating in the borehole a drilling fluid containing a finely ground, very sparingly soluble, anhydrous alkali metal silicate glassy material in an amount to provide the drilling fluid with a concentration of soluble silica in the range from about 0.1% to about 1.0% by weight of the aqueous phase of the drilling fluid.

2. The method of claim 1 further comprising periodically determining the concentration of soluble silica in the aqueous phase of the drilling fluid is periodically determined as the drilling proceeds and, when needed, adjusting the rate of addition of the finely ground, very sparingly soluble, anhydrous alkali metal silicate glassy material to maintain said concentration range.

3. The method of claim 1 or 2 wherein the alkali metal is potassium and the potassium silicate has a weight ratio of SiO$_2$:K$_2$O from about 2:1 to about 3.5:1.

4. The method of claim 3 wherein the potassium silicate has a weight ratio of SiO$_2$:K$_2$O from about 2.25:1 to about 3.25:1.

5. The method of claim 3 wherein the potassium silicate has a weight ratio of SiO$_2$:K$_2$O from about 2.5:1 to about 3.0:1.

6. The method of claim 3 wherein the potassium silicate has a weight ratio of SiO$_2$:K$_2$O which is greater than about 2.5:1.

7. In a well drilling process in which a drilling fluid is circulated in a borehole while drilling, a method of increasing the recovery of shale-containing cuttings which comprises adding to the circulating drilling fluid a finely ground, very sparingly soluble, anhydrous alkali metal silicate glassy material at a rate to provide the drilling fluid with a concentration of soluble silica in the range from about 0.1% to about 1.0% by weight of the aqueous phase of the drilling fluid, wherein the drilling fluid has a pH in the range from about 8.0 less than 11.0.

8. The process of claim 1 further comprising periodically determining the concentration of soluble silica in the aqueous phase of the drilling fluid as the drilling proceeds and, when needed, adjusting the rate of addition of the finely ground, very sparingly soluble, anhydrous alkali metal silicate glassy material to maintain said concentration range.

9. The process of claim 1 or 8 wherein the alkali metal is potassium and the potassium silicate has a weight ratio of SiO$_2$:K$_2$O ratio from about 2:1 to about 3.5:1.

10. The process of claim 9 wherein the potassium silicate has a weight ratio of SiO$_2$:K$_2$O ratio from about 2.25:1 to about 3.25:1.

11. The process of claim 9 wherein the potassium silicate has a weight ratio of SiO$_2$:K$_2$O ratio from about 2.5:1 to about 3.0:1.

12. The process of claim 9 wherein the potassium silicate has a weight ratio of SiO$_2$:K$_2$O ratio which is greater than about 2.5:1.

13. The process of claim 8 wherein the concentration of soluble silica in the aqueous phase of the drilling fluid is periodically determined by obtaining drilling fluid at the flowline of the well and then measuring the concentration of silica therein.

14. The process of claim 1 further comprising periodically determining the concentration of soluble silica in the filtrate of the drilling fluid at the flowline.

15. The process of claim 14 wherein the alkali metal is potassium and the potassium silicate has a weight ratio of SiO$_2$:K$_2$O ratio from about 2:1 to about 3.5:1.

16. The process of claim 15 wherein the potassium silicate has a weight ratio of SiO$_2$:K$_2$O ratio from about 2.25:1 to about 3.25:1.

17. The process of claim 15 wherein the potassium silicate has a weight ratio of SiO$_2$:K$_2$O ratio from about 2.5:1 to about 3.0:1.

18. The process of claim 15 wherein the potassium silicate has a weight ratio of SiO$_2$:K$_2$O ratio which is greater than about 2.5:1.

* * * * *

UNITED STATES PATENT AND TRADEMARK OFFICE
CERTIFICATE OF CORRECTION

| | |
|---|---|
| PATENT NO. | : 7,441,609 B2 |
| APPLICATION NO. | : 11/263639 |
| DATED | : October 28, 2008 |
| INVENTOR(S) | : Harry L. Dearing, Jr. |

It is certified that error appears in the above-identified patent and that said Letters Patent is hereby corrected as shown below:

On the title page item (54) and col. 1, line 1, title should read: "Method of Increasing the Recovery of Shale-Containing Cuttings During Drilling of a Borehole"

Signed and Sealed this

Thirty-first Day of March, 2009

JOHN DOLL
*Acting Director of the United States Patent and Trademark Office*